C. P. BETTENGA.
POULTRY WATERER.
APPLICATION FILED SEPT. 13, 1919.

1,354,943.

Patented Oct. 5, 1920.

Inventor,
C. P. Bettenga, by
G. C. Kennedy,
Attorney.

UNITED STATES PATENT OFFICE.

CRENO P. BETTENGA, OF PARKERSBURG, IOWA.

POULTRY-WATERER.

1,354,943.  Specification of Letters Patent.  Patented Oct. 5, 1920.

Application filed September 13, 1919. Serial No. 323,451.

*To all whom it may concern:*

Be it known that I, CRENO P. BETTENGA, a citizen of the United States of America, and a resident of Parkersburg, Butler county, Iowa, have invented certain new and useful Improvements in Poultry-Waterers, of which the following is a specification.

This invention relates to improvements in poultry waterers, and the objects of my improvements are first, to supply a vacuum-controlled fluid delivery device whose construction permits constant delivery to a drinking trough without overflowing the latter and without possibility of back-draft into the device of fouled water from the trough; and second, to form and govern the delivery conduit of the device so as to leave a portion of the receptacle's contents intact therein after cessation of delivery of said contents.

Figure 1:
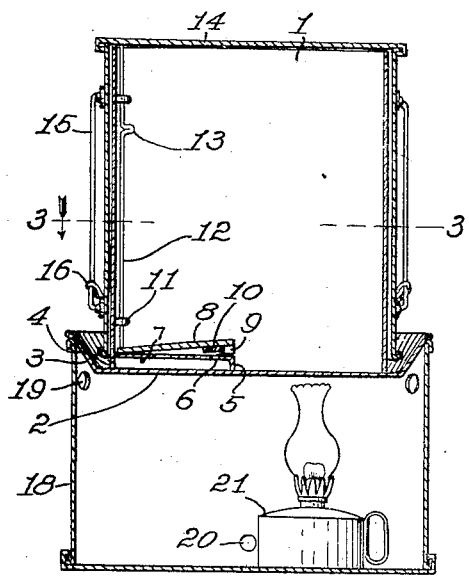
Figure 2:
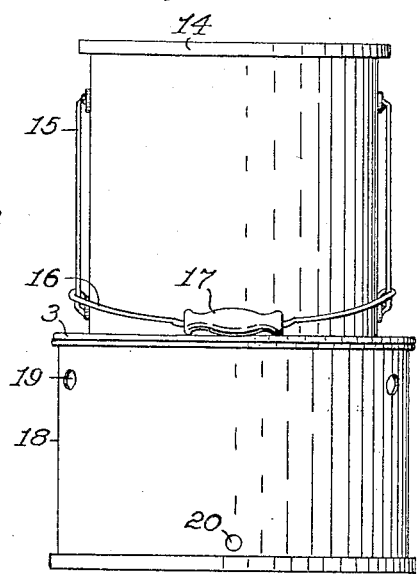
Figure 3:
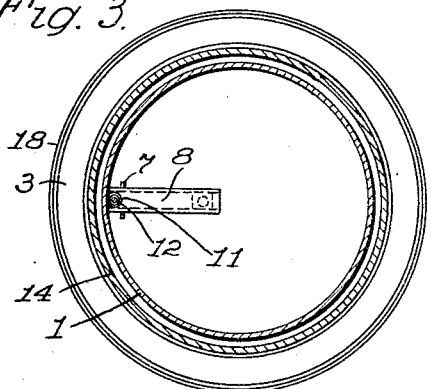
Figure 4:
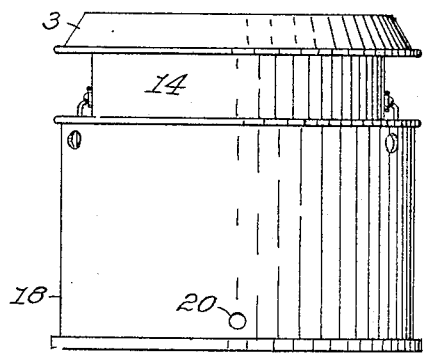
Figure 5:
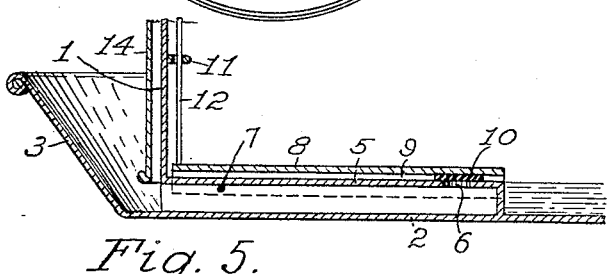

These objects, as also others to be more specifically described, are accomplished by the means illustrated in the accompanying drawings, in which Figure 1 is a central vertical transverse section of my improved poultry waterer with its elements in operative arrangement and positions; Fig. 2 is an elevation of said device; Fig. 3 is a horizontal section of the device on the broken line 3—3 of said Fig. 1, and looking in the direction indicated by the arrow; Fig. 4 is an elevation of the parts of the device as disassembled and reassembled in a collapsed relation, and Fig. 5 is an enlarged section of the liquid delivery means and the adjacent parts of the device.

Similar numerals of reference denote corresponding parts throughout the several views.

My improved watering device is particularly designed for use by fowls, but may be made of any form or dimensions desired which would be appropriate to the invention.

The numeral 1 denotes an open top closed bottom upright cylindrical receptacle for water. The numeral 3 denotes an open top trough surrounding the lower end of said receptacle concentrically, and may be formed by extending the bottom 2 outwardly sloping upwardly.

The numeral 18 denotes an open top closed bottom upright cylindrical chamber of greater diameter than the receptacle 1, the bottom of the latter being placed together with the sloping part of the trough 3 upon the upper edge of the chamber removably to close it. The chamber 18 is provided with a number of ventilating openings 19 and 20 respectively near the top and bottom thereof, and heating-means such as a lamp 21, may be placed in said chamber under the bottom 2 of the receptacle 1 to heat the liquid contents of the latter when desired, as in cold weather. My watering device, however, is complete for use without this added heating chamber 18.

The numeral 14 denotes an imperforate cylindrical upright casing closed at the top and open at the bottom and of somewhat larger diameter than the receptacle 1 so that it may be positioned over the latter with its lower edge supported on the extension of the bottom 2 within the trough 3, leaving a concentric air space between itself and the outer wall of said receptacle.

As shown in Fig. 2, the casing 14 is provided on opposite sides thereof with the vertically elongated spaced rods or loops 15 whose ends are secured to the casing near the upper and lower ends thereof. A bail 16, provided with a medial handle 17, has terminal loops slidably mounted on the rods 15. As the rods 15 extend up and down about equal distances beyond the medial horizontal line of the casing 14, the bail 16, when parts of the device are assembled as in Fig. 2, may be slid up along the rod and then used to lift said casing away from the receptacle 1. The casing may then be inverted to have its open bottom at the top, the bail 16 then slid along the rod 15 reversely and the casing then can be used as a bucket or container for liquid to carry the liquid to and empty it into the receptacle 1.

The numeral 4 denotes a small fluid-delivery port in the lower part of the receptacle 1 and which delivers into the bottom of the trough 3. The numeral 5 denotes an elongated closed conduit positioned upon the bottom 2 radially at its outer end communicating with the port 4 and being imperforate otherwise except for a small opening 6 in its top near its inner end. The numeral 8 denotes a flat elongated plate having depending slide flanges 9, the flanges having near their outer ends small orifices whereby they are pivoted on short fixed pintles 7 on the conduit 5. A flat piece 10 of leather or rubber is mounted on the under face of the plate 8 and adapted when the plate 8 is lowered, to close the opening 6 in said conduit. The numeral 11 denotes a pair of vertically spaced eyes fixed on the inner wall of said receptacle above the outer end of the plate 8, and a rod 12 is slidably mounted in said eyes with its lower end supported upon the plate 8 without the pintle 7. Said rod may have a looped bend or other stop 13 under the upper eye 11 to prevent its escape when the receptacle is inverted for cleaning. The upper end of the rod 12 extends a short distance above the upper edge of the receptacle 1. When the casing 14 is placed about the receptacle 1, it rests upon the upper end of the rod 12, and its weight pushes down the rod, thereby rocking downwardly the outer shorter end of the plate 8 on the pintle 7 and lifting the forward end of the plate with the pad 10, uncovering the opening 6 in said conduit and allowing the liquid in the receptacle to pass through the conduit and the port 4 into the annular trough 3, its level in the latter being determined by the location of the port 4 below the upper outer edge of the trough so that the trough cannot overflow. This is due to the well known principle of a vacuum being formed in the upper parts of the casing 14 and receptacle 1 as the water in the latter subsides by reason of its said delivery into the trough.

It will be observed that as the opening 6 of the conduit 5 is spaced above the bottom 2 of said receptacle, that when the water level has fallen to the level of the top of the conduit, the remainder will not escape from the receptacle, but forms a layer over its bottom. When the chamber 18 and heating means 21 are employed, this layer of liquid prevents burning of the bottom of the receptacle, as the water layer is self-maintaining. That is, vapor of water evaporated will condense in the upper part of said casing and receptacle. The air space between the concentric walls of the casing and receptacle prevents freezing of the contents of the latter except when the temperature is very low.

It is to be noted that my device is sanitary, because any dirt or filth which may have entered the trough 3 cannot be drawn into the interior of the receptacle 1. When the casing 14 is lifted away from the receptacle 1, the weight of the longer or inner part of the pivoted plate 8 rocks it back downwardly closing the opening 6 in the conduit while the other or shorter end of the plate lifts the rod 12 to its first position. The receptacle is thus closed and ready to receive refilling.

As the trough 3 is low and located at the bottom of the receptacle 1, in other seasons than the winter, the chamber 18 may be removed and the receptacle placed upon the ground where its contents may be reached by small chickens.

The relative forms and dimensions of the parts of said device are such that, as shown in Fig. 4, the casing and receptacle may be placed in an inverted position within the chamber 18, nesting them compactly, decreasing the height one-half, and affording flat top and bottom surfaces whereby they may be stored or transported, with a number of them in superposed relation, to economize space.

Having described my invention, what I claim as new, and desire to secure by Letters Patent, is:

1. In a device of the character described, an open top closed bottom receptacle having an outer open top trough around its lower end and having a delivery passage located below the upper outer edge of the trough and in communication with the trough, an open bottom imperforate casing inclosing said receptacle removably with its lower edge positioned within the trough, a valve pivotally mounted within the receptacle and by its own gravity normally closing said delivery passage, and means within the receptacle for tilting said valve to open said delivery-passage engaged with and operable by the top of said casing when the latter is superposed over said receptacle.

2. In a device of the character described, an open top closed bottom receptacle having an outer open top trough around its lower end and having a delivery-port located below the upper outer edge of the trough and in communication therewith, a closed top open bottom casing about said receptacle and extending into said trough, a conduit in said receptacle having a valve-seat, a swinging valve operable to close or open said valve-seat, and a rod movable in said receptacle and engaged between the valve and said casing when the latter is in position about the receptacle, the weight of the casing causing the rod to swing open the valve, the valve closing by gravity when the weight of the casing is removed.

Signed at Waterloo, Iowa, this 3rd day of September, 1919.

CRENO P. BETTENGA.